J. F. STROMBOM.
VEHICLE SIGNALING DEVICE.
APPLICATION FILED JAN. 21, 1921.
1,419,777.
Patented June 13, 1922.
5 SHEETS—SHEET 3.
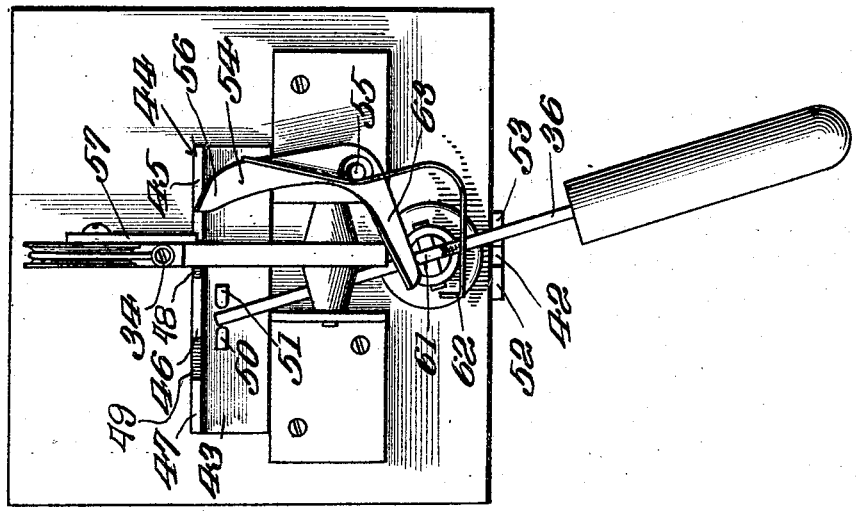
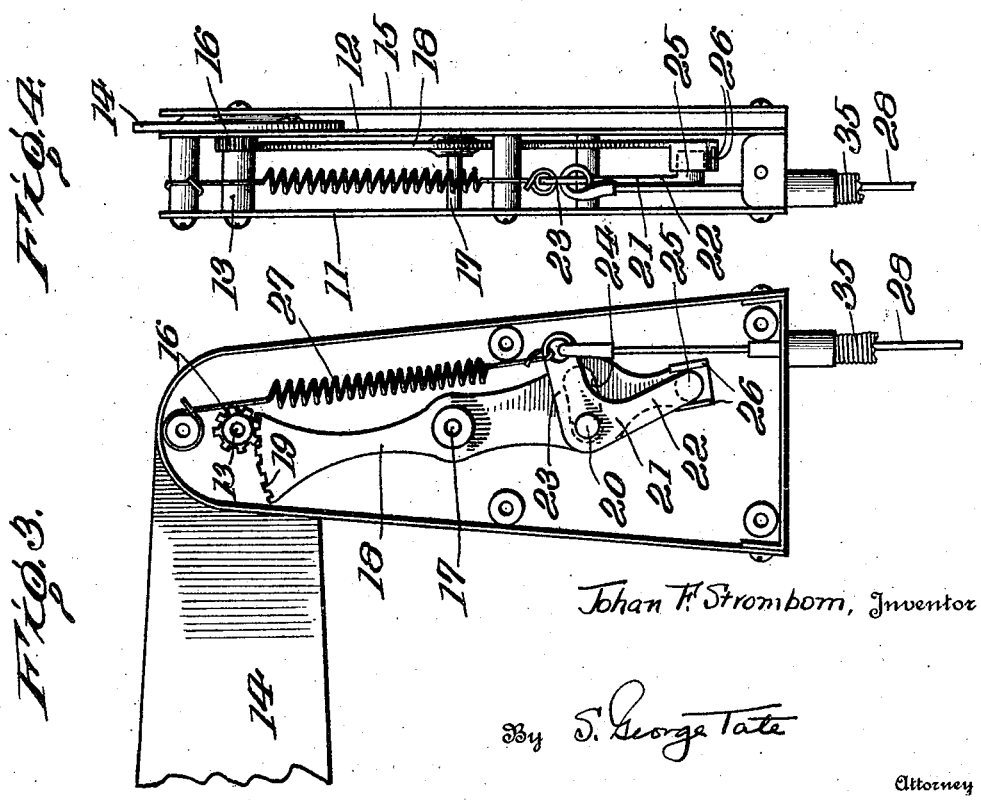
Johan F. Strombom, Inventor
By S. George Tate
Attorney

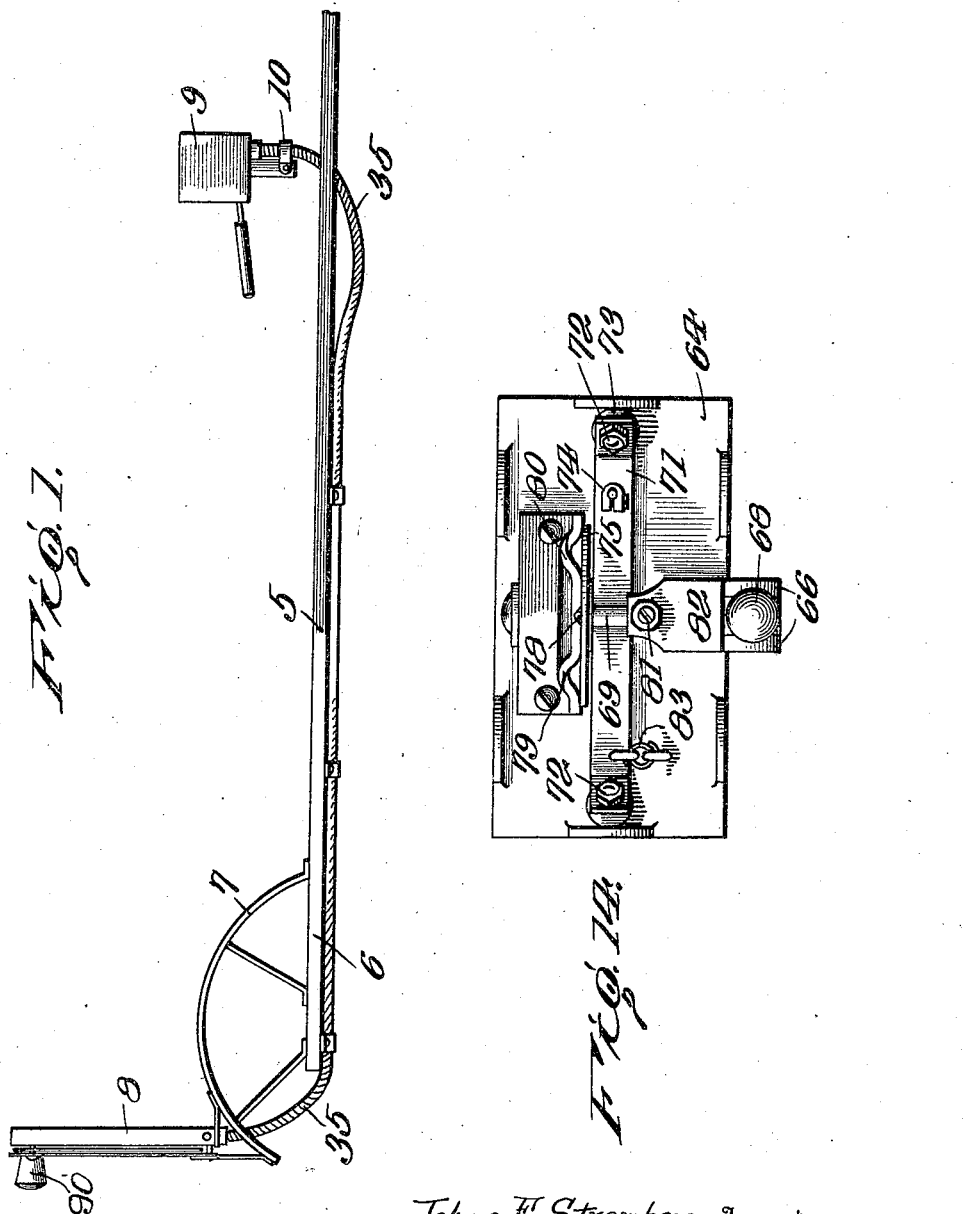

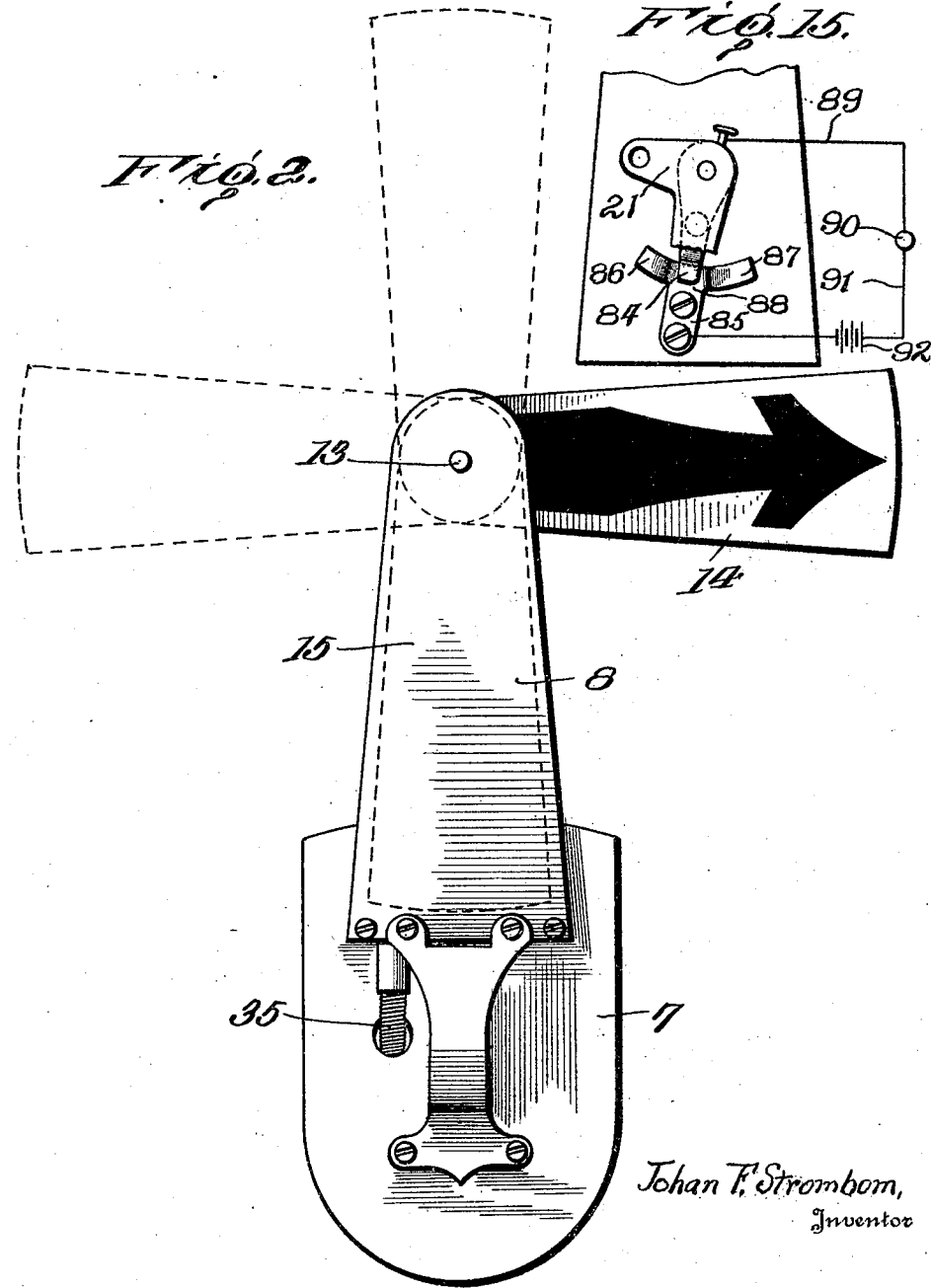

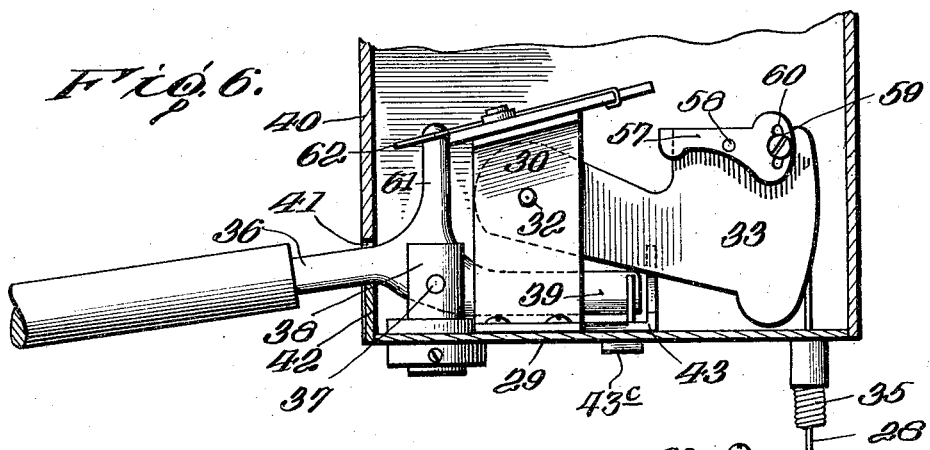
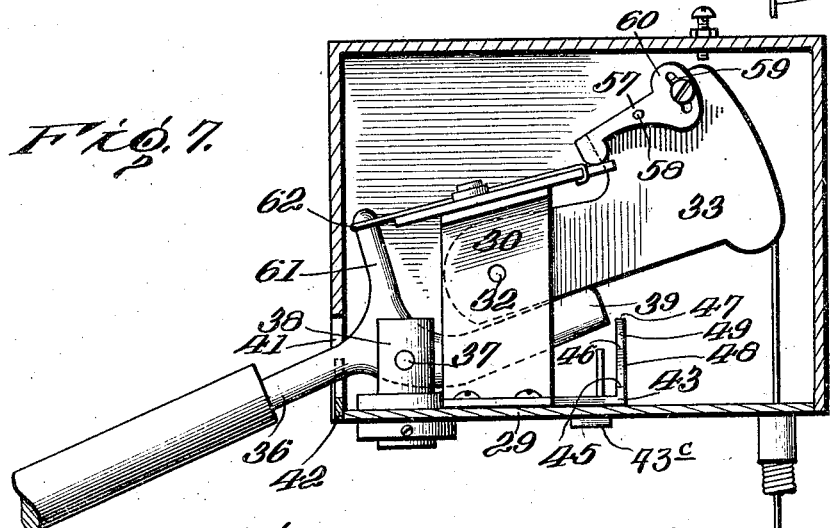
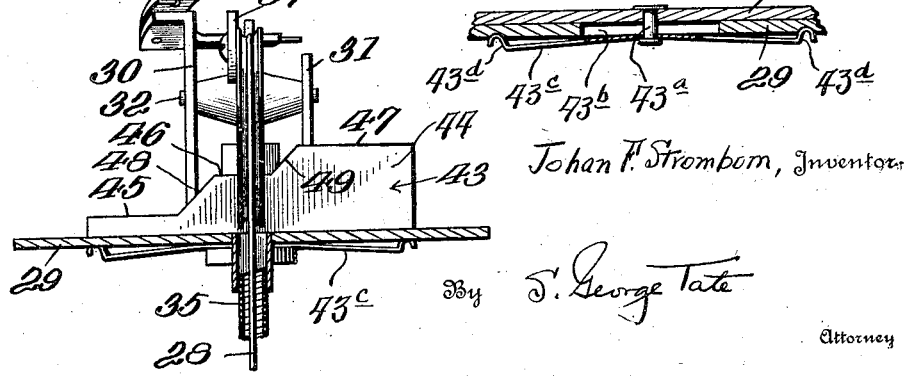

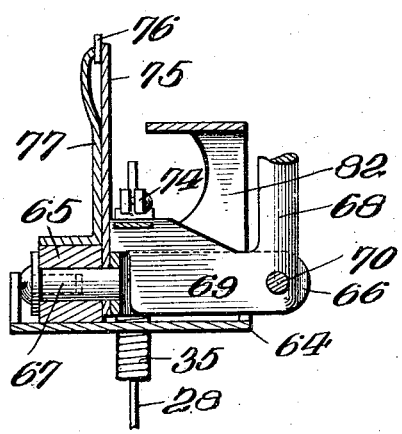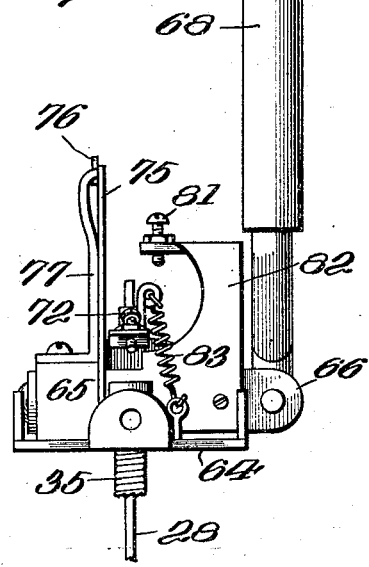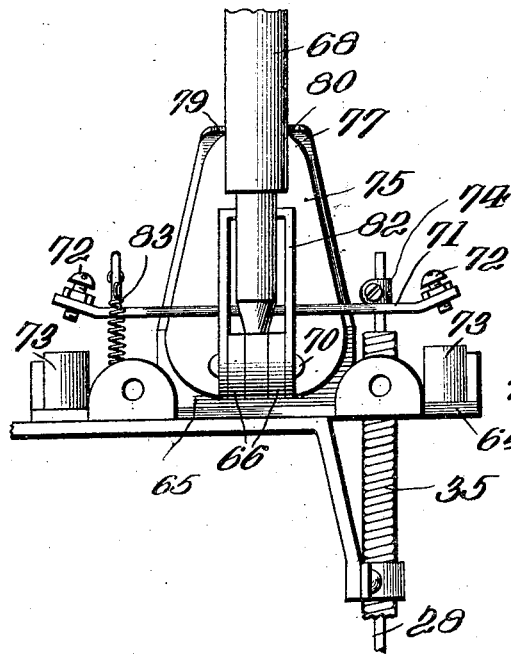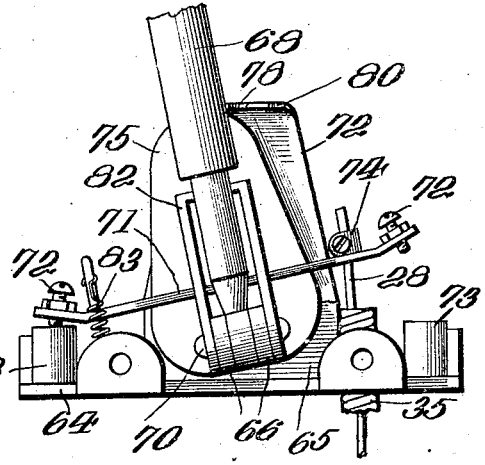

UNITED STATES PATENT OFFICE.

JOHAN F. STROMBOM, OF CHICAGO, ILLINOIS.

VEHICLE SIGNALING DEVICE.

1,419,777.  Specification of Letters Patent.  Patented June 13, 1922.

Application filed January 21, 1921. Serial No. 438,896.

*To all whom it may concern:*

Be it known that I, JOHAN F. STROMBOM, a subject of King Gustaf of Sweden, residing at Chicago, in the county of Cook and State of Illinois, have invented certain new and useful Improvements in Vehicle Signal Devices, of which the following is a specification.

This invention relates to new and useful improvements in vehicle signaling devices of that type in which the signal is positioned on the rear end of the vehicle and is actuated by an operator located at the front end of the vehicle.

The principal object of my invention is to provide a signal of the semaphore type in which the indicating arm is normally concealed, and a single controlling lever for shifting the arm to any one of several predetermined visible positions.

Another object of the invention is to provide a single controlling lever which is movable in opposite directions to correspondingly move the indicating arm to operative or indicating positions.

A further object of the invention is to provide a single controlling lever which is movable in opposite directions in one plane and also movable in a plane at right angles to the first mentioned plane, and which is connected to the indicating arm whereby the latter may be moved to any one of three operative or indicating positions.

In the accompanying drawings,

Figure 1 is a side elevation showing more or less diagrammatically a vehicle having one form of my invention applied thereon.

Figure 2 is a front view of the signal showing the arm in one of its indicating positions.

Figure 3 is a rear view of the signal, the rear cover plate being removed to show the operating mechanism for the indicating arm, Figure 4 is a side elevation of the signal, the side cover plate being removed, Figure 5 is a plane view of the signal controlling mechanism, the controlling lever thereof being shown in its position corresponding to the position of the indicating arm of the signal shown in Figures 2, 3 and 4, Figure 6 is a side elevation of the controlling mechanism, showing the controlling lever in its neutral position, Figure 7 is a similar view, but showing the controlling lever in its position corresponding to the position of the indicating arm of the signal, when said arm is projecting upwardly in a vertical plane, Figure 8 is a front elevation of the controlling mechanism, the parts being shown in their neutral positions, Figure 9 is a detail sectional view showing the spring latch for retaining the controlling lever in its neutral position, Figure 10 is a side elevation of a modified form of controlling mechanism, Figure 11 is a vertical sectional view of the same, Figure 12 is a front elevation, showing the controlling lever in neutral position, Figure 13 is a similar view, but showing the controlling lever in one of its effective positions, and Figure 14 is a top plan view showing the controlling lever in its neutral position, and Figure 15 is a detail view showing the automatic switch and light circuit.

Like reference numerals designate corresponding parts in all the figures of the drawings.

Referring to the drawings, 5 indicates a vehicle body, 6 the bottom thereof, and 7 one of the mud guards.

In this particular instance, I have shown the signal 8 mounted on the mud guard and the controlling mechanism 9 supported on the floor or bottom 6 by a bracket 10.

The signal 8 includes a closed casing having front and rear walls 11 and 12. Journaled in the upper ends of said walls is a shaft 13, which extends rearwardly beyond the rear wall 12 and has rigidly secured on said end an indicating arm 14. This arm is capable of being swung in either direction about its supporting shaft or pivot 13. Normally, this indicating arm extends directly below its fulcrum and is concealed by a cover plate or shield 15 which is secured to the casing.

Fixed to the pivot shaft 13 is a pinion 16 which is disposed within the casing. Also arranged within the casing and fulcrumed on a counter-shaft 17 is a lever 18, the upper end thereof being formed with a segmental rack 19 which is engaged with the pinion 16. Also disposed within the casing is a second counter shaft 20 and journaled on this shaft is a bell crank lever 21 having a vertically extending arm 22 and a horizontally extending arm 23. This second counter shaft extends through an elongated opening 24 formed in the lower arm of the lever 18, the opening serving as a clearance to permit oscillatory movements of said lever. Fixed to the lower end of the arm 22 of the bell-crank lever 21 is a stud 25 having engagement with spaced ears 26—26 formed on the lower end of the lever 18. The stud 25 and ears 26 form a loose operating connection between the lever 18 and the bell-crank lever 21. A coil spring 27 is connected at one end to the end of the horizontal arm 23 of said bell-crank lever and at its other end to the casing. A flexible cable 28 has one end connected with the horizontal arm 23 of the bell-crank lever and has its other end connected to and controlled by the controlling mechanism 9.

From the foregoing, it will be observed that if a pull is exerted on the cable 28 in a direction away from the spring 27, the bell-crank lever 21 will rock the lever 18, and the rack 19 thereof meshing with the pinion 16 will swing the signal arm 14. It will also be apparent that if this strain on the cable 28 is relieved, the spring 27 will tend to return the parts to their normal positions. In Figures 2, 3 and 4 I have shown the indicating arm 14 as projecting towards the right when viewed from the rear of the machine. The arm is caused to swing upwardly out of its normal position within the casing by means of the spring 27 acting on the bell-crank lever 21 simultaneously with the release of the strain on the cable 28. When it is desired to swing the arm to the left, a pull on the cable 28 will cause the arm 14 to first return to its neutral position before swinging upwardly into its effective position. When it is desired to swing the arm 14 to point upwardly, a further pull on the cable 28 will cause the operating mechanism within the casing to so position the arm.

The controlling mechanism for the signal includes a base plate 29, from which rises a pair of standards 30 and 31. Journaled in these standards is a shaft 32, to which is fixed an operating arm 33. The outer end of the arm 33 is grooved to receive the cable 28, and this cable is fastened to the arm 33 by a screw 34. The cable 28 is enclosed in a flexible tubing 35, one end of the tubing being suitably secured to the signal casing, and the other end being suitably secured to the base plate 29 of the controlling mechanism. It will be noted that when the arm 33 is raised, an upward pull on the cable 28 will be made, this pull being against the tension of the spring 27.

A controlling lever 36 is fulcrumed on a horizontal shaft 37, which is secured to a vertically extending support 38. The support 38 is journaled in the base plate 29 so as to oscillate about a vertical axis. The lever 36 has one end 39 projecting under the arm 33.

Secured to the base plate 29 is a casing 40, which is provided with a horizontally extending opening 41, and a centrally disposed communicating vertical opening 42. The lever 36 projects through the opening 41 and is adapted to be moved into the vertical opening 42. Thus, when the outer end of the lever 36 is depressed, the inner arm 39 thereof will be moved upwardly against the arm 33, thus causing the latter, in turn, to be swung upwardly about its pivot 32.

A cam plate 43 has an upwardly extending wall 44, having a series of stop surfaces 45, 46 and 47 with communicating cam surfaces 48 and 49 there-between. This cam plate 43 is disposed under the arm 33 and is movable endwise in a horizontal plane, or in a direction at right angles to the path of movement of the arm 33. Secured to the cam plate 43 is a pair of spaced stops 50 and 51, and between these stops the end of the arm 39 of the arm lever projects.

It will be borne in mind that the spring 27 is always exerting a pull on the cable 28. When the controlling lever 36 is swung to the right, as shown in Figure 5, the arm 33 will rest on the stop surface 45, and consequently a slack will occur in the connection 28 which will be taken up by the spring 27, and, through the bell-crank lever 21, the signal arm 14 will be swung to the right, or to the position indicated in Figures 2, 3 and 4. It will also be seen that when the operating lever is moved to the right, the signal arm is moved to a corresponding indicating position. When the controlling lever 36 is shifted to the extreme left position, the arm 33 will be caused to slide upwardly along the cam surface 48, stop surface 46, cam surface 49 and on to the stop surface 47, thus exerting an upward pull on the cable 28 against the tension of the spring 27. This movement swings the arm 14 downwardly past its neutral position and thence upwardly to a horizontal position, or to the "left" indicating position. When it is desired to return the arm 14 to its neutral position from either of the above mentioned positions, the controlling lever is moved into alignment with the arm 33 and with the vertical slot 42. In this position the stop surface 46 is brought directly under the arm 33.

Carried by the cam plate 43 is a pin 43$^a$, which passes through an elongated opening 43$^b$ in the base plate 29. A leaf spring 43$^c$ is secured to the pin 43$^a$ and the ends of this spring are bent to form detents 43$^d$—43$^d$. When the lever 36 is in its neutral position, the detents 43$^d$ engage in suitable seats formed in the base plate 29, as shown in Figure 9 of the drawings, to frictionally retain said lever against accidental movement to the right or to the left.

When the lever 33 is swung to either of its extreme right or left hand positions, said lever will be limited in its movements by contacting with the spaced uprights 30 and 31. On opposite sides of the vertical slot 42 are stops 52 and 53. These stops are disposed directly under the lever 36 when the latter is in either of its extreme right or left hand positions. Consequently, when the lever is in either of these positions, it cannot be depressed until it is first returned to its neutral position, that is in alignment with the slot 42.

In order to lock the arm 33 in position when the controlled lever 36 is depressed for the purpose of swinging the signal arm to its uppermost, or "stop" position, I have provided a locking mechanism. This mechanism includes a bell-crank latch 54 which is fulcrumed at its angle, as at 55, to the upper end of the standard 30. One end of one arm 56 of said latch is normally spaced from the arm 33, but is adapted to be moved to a position directly under a stop plate 57, which is fulcrumed on the arm 33, as at 58. A screw 59 passes through a slot 60 in said plate and serves to lock the plate in any adjusted position. The controlling lever 36 is provided with an upwardly extending arm 61 which is adapted to engage a spring 62 carried by the latch 54. When the controlling lever 36 is depressed, the arm 61 thereof engages the spring 62 and while the arm 33 is being raised, the arm 56 of the latch 54 is moved towards said arm 33. As soon as the arm 56 engages the side face of the locking plate 57, the continued downward movement of the controlling lever 36 exerts a greater tension on the spring 62, so that just as soon as the arm 33 is raised sufficiently high, the arm 56 of the latch will be forced under the stop plate 57. This latch will, therefore, hold the arm 33 in its raised position until the latch is released. In order to release the latch, and return the signal arm and the controlling lever to their normal positions, the controlling lever is raised, and, during this movement, the vertical arm 61 thereof will engage the arm 63 of the latch and cause the same to swing about its fulcrum pin 55, thereby disengaging the arm 56 from the stop plate 57. The spring 27 of the signal will immediately exert a pull on the cable 28 and cause the arm 33 of the controlling mechanism and the indicating arm 14 of the signal to return to their normal or neutral positions.

From the foregoing, it will be seen that the controlling lever is movable in opposite directions and in a horizontal plane to correspondingly move the indicating arm of the signal. It will also be observed that the controlling lever may be moved in a vertical plane, and this movement will shift the indicating arm to a corresponding vertical position. It will also be noted that the signal includes an indicating device which is fulcrumed to move to three different indicating positions, and that I have provided an actuating means therefor, which includes a single controlling lever fulcrumed to move in three different directions to three different operative or effective positions.

It will also be noted that the controlling lever is fulcrumed to move in opposite directions in a substantially horizontal plane to operative positions, and in a vertical plane to another operative position. It will also be noted that the indicating device is fulcrumed to move 90 degrees in opposite directions to two indicating positions, and to move 180 degrees to a third indicating position. It will also be noted that the flexible connection or cable is moved endwise either by the spring 27 or by the cam plate, which, in turn, is actuated by the controlling lever.

In the modified form of controlling mechanism, as illustrated in Figures 11 to 14, both inclusive, I have provided a base plate 64, to which is secured a block 65. A frame 66, which is U-shaped in plan view, is provided with a fulcrum pin 67, which is journaled in the block so as to permit the frame 66 to rock about a vertical axis. Pivoted to the frame 66 is a controlling lever 68, and this lever is provided with an extension 69 which fits between the arms of the frame 66. The pivot 70 for the lever is a horizontal pivot, so that when the lever is rocked in a vertical plane, the extension 69 thereof will likewise move in a vertical plane. When, however, the lever 68 is rocked on the fulcrum pin 67, the extension 69 is likewise rocked. Secured to the extension 69 is a horizontally disposed arm 71. Stop screws 72—72 are carried by the outer ends of the arm 71, and are respectively adapted to cooperate with stop posts 73—73 carried by the base plate 64. As a result of these stop screws 72 and stop posts 73, the movement of the hand lever, when rocked about its fulcrum pin 67, is limited thereby. The endwise movable connection or cable 28 passes through an opening located adjacent one end of the arm 71, and a clamping collar 74 is secured to the cable above the arm. It will thus be seen that when the lever is rocked from its neutral position, as shown in Figure 12, to one of its operative positions, as shown in Figure 13, the arm 71 will engage the collar 74 and thereby lift up the cable 28, or, in other words, impart an endwise movement thereto against the tension of the spring 27.

In order to retain the controlling lever in its neutral position, and also in two of its operative positions, I have provided a plate 75, which is secured to the rocking frame 66. The upper end of this plate 75 carries a pin 76. A locking plate 77 is secured to the block 65 and is disposed in rear of the spring plate 75. The upper end of the locking plate 77 is centrally formed with a notch 78 for receiving the pin 76 and thereby retaining the controlling lever in its normal position. This locking plate 77 is provided on opposite sides of the notch 78 with notches 79 and 80, which respectively receive the pin 76, when the lever 68 is moved to either of its extreme right or left hand positions. It will, of course, be understood that when the lever is moved to the right hand position, the cable 28 will be released by the arm 71, and the spring 27 will cause an endwise movement to said cable, and at the same time actuate the signal arm.

When the operating lever 68 is moved forwardly about its pivot 70, the rocking frame 66 is likewise moved, and this movement bodily raises the arm 71. This movement of the arm 71 is twice as great as when the lever is moved to the position shown in Figure 13. Consequently, the cable will be moved twice the distance, and, in turn, the signal arm will be swung 180 degrees from its neutral position to the "stop" position. In order to adjust the extreme movement of the frame 66 to a nicety, I have provided an adjusting screw 81 which is carried by a frame 82 connected to the frame 66. Inasmuch as the cable 28 is connected to the arm 71 at one side of the controlling lever, it is advisable to balance the pull, and to this end I have provided a coil spring 83, which is connected to the opposite end of the arm 71 and with the base plate 64.

Whenever the indicating arm 14 is moved from its neutral position, it is desirable to automatically light a signal lamp, and to this end I have provided the bell-crank lever 21 with a contact piece 84. A contact plate 85 is secured to the signal casing, and is provided with oppositely extending contact fingers 86 and 87, and with a depressed portion 88 disposed therebetween. This plate 85 is positioned on the casing so that when the signal arm 14 is in its neutral position, the contact plate 84 will be disposed in alignment with the depressed portion 88 and between the contact fingers 86 and 87, but out of contact therewith. A wire 89 leads from the contact plate or finger 84 to a lamp 90 which is suitably mounted on the signal casing. A wire 91 leads from the lamp through a battery 92, or other source of electrical energy, to the contact plate 85. Thus, when the signal arm 14 is swung to the right, as shown in Figure 2, the contact finger 84 will engage the contact finger 86 and thereby close the circuit and light the signal lamp. Should the signal arm 14 be swung upwardly from its neutral position on the opposite side of its fulcrum 13 from that shown in Figure 2, or even should it be swung upwardly for 180 degrees, the contact plate or finger 84 will engage the contact finger 87 and thereby light the signal lamp. Whenever the signal arm 14 is returned to its neutral position, the contacts will be broken.

What I claim is:

1. In a vehicle signaling device, the combination of a single indicating device fulcrumed to be moved in opposite directions to three different indicating positions, and actuating means therefor including a single controlling lever fulcrumed to move in three different directions to three different operative positions.

2. In a vehicle signaling device, the combination of an indicating device fulcrumed to move to three different indicating positions, and actuating means therefor including a single controlling lever fulcrumed to move in opposite directions to two operative positions and in a direction at right angles thereto to a third operative position.

3. In a vehicle signaling device, the combination of an indicating device fulcrumed to move 90 degrees in opposite directions to two indicating positions and to move 180 degrees to a third indicating position, and actuating means therefor including a single controlling lever fulcrumed to move to three different operative positions.

4. In a vehicle signaling device, the combination of an indicating arm fulcrumed to move to three different indicating positions, and actuating means therefor including a single controlling lever fulcrumed to move to three different operative positions, said controlling lever and said indicating arm being necessarily returnable to neutral positions before said arm and lever can be moved to any other positions.

5. In a vehicle signaling device, the combination of an indicating device fulcrumed to move to three different indicating positions, and actuating means therefor including a single controlling lever fulcrumed to move to three different operative positions, said lever being movable to operative positions in planes at right angles to one another, and means for preventing said lever, when in an operative position, from being moved from one plane to the other.

6. In a vehicle signaling device, the combination of an indicating device fulcrumed to move to three different indicating positions, and actuating means therefor including a single controlling lever fulcrumed to move to three different operative positions, said controlling lever being pivoted to move in opposite directions in a substantially horizontal plane to operative positions and in a vertical plane to another operative position.

7. In a vehicle signaling device, the combination of an indicating device fulcrumed to be moved in opposite directions to three different indicating positions, actuating means therefor including a single controlling lever fulcrumed to move to three different operative positions, and means for retaining said lever in any one of its operative positions.

8. In a vehicle signaling device, the combination of an indicating device fulcrumed to move to three different indicating positions, and actuating means therefor including a single controlling lever fulcrumed to move to three different operative positions and an endwise movable operating connection between the indicating device and the controlling lever.

9. In a vehicle signaling device, the combination of an indicating device fulcrumed to move to three different indicating positions, and actuating means therefor including a single controlling lever fulcrumed to move to three different operative positions, an endwise movable operating connection between the indicating device and the controlling lever, and a spring for moving said operative connection endwise upon movement of the controlling lever in one direction.

10. In a vehicle signaling device, the combination of an indicating device fulcrumed to move to three different indicating positions, and actuating means therefor including a single controlling lever, a support mounted to oscillate about a vertical axis, and means for supporting said lever on said support whereby said lever may oscillate about a horizontal axis.

11. In a vehicle signaling device, the combination of an indicating device fulcrumed to move to three different indicating positions, and actuating means therefor including a single controlling lever fulcrumed to move to three different operative positions, an actuating arm pivoted above the lever, an endwise movable operating connection between said arm and the indicating device, a spring for moving said operative connection endwise upon movement of the controlling lever in one direction, and a cam plate movably mounted under and co-operating with said actuating arm to move the latter against the tension of said spring, said cam plate being connected to and movable by said controlling lever.

12. In a vehicle signaling device, the combination of an indicating device fulcrumed to move to three different indicating positions, and actuating means therefor including a single controlling lever fulcrumed to move to three different operative positions, said controlling lever being pivoted to move in opposite directions in a substantially horizontal plane to operative positions and in a vertical plane to another operative position, an actuating arm pivoted above the lever to move in a vertical plane, an endwise movable operating connection between said arm and said indicating device, and means for locking said actuating arm in its operative position when swung upwardly by said lever, said locking means being released by said lever when the latter is moved in the opposite direction.

13. In a vehicle signaling device, the combination with a casing, of a pivot shaft journaled therein, an indicating arm fixed at its upper end to said pivot shaft, a stationary shield for covering said arm when the latter is in its normal position, a pinion fixed on said shaft, a lever fulcrumed on the casing and having its upper end provided with a rack having engagement with said pinion, the lower end of said lever having an elongated opening formed therein, a shaft journaled in said casing and extending through said opening, a bell-crank lever fixed to said shaft, one arm of said bell-crank lever having a loose connection with the lower end of said rack-carrying lever, a spring connecting the other arm of said bell-crank lever with the casing, and actuating means connected to the last mentioned arm of said bell-crank lever for swinging said indicating arm beyond said shield to operative positions.

In testimony whereof I affix my signature in the presence of two witnesses.

JOHAN F. STROMBOM.

Witnesses:
Wм. M. Hickey,
Carl Le Roy Segersten.